(12) United States Patent
Smith et al.

(10) Patent No.: US 8,990,202 B2
(45) Date of Patent: Mar. 24, 2015

(54) IDENTIFYING AND SUGGESTING CLASSIFICATIONS FOR FINANCIAL DATA ACCORDING TO A TAXONOMY

(75) Inventors: Ben Smith, Oxford (GB); Paul Warren, Oxford (GB); David North, Oxford (GB); Richard Ashby, Oxford (GB); Martin Hutchinson, London (GB)

(73) Assignee: CoreFiling S.A.R.L., Luxembourg (LU)

( * ) Notice: Subject to any disclaimer, the term of this patent is extended or adjusted under 35 U.S.C. 154(b) by 20 days.

(21) Appl. No.: 13/288,358

(22) Filed: Nov. 3, 2011

(65) Prior Publication Data

US 2013/0117268 A1 May 9, 2013

(51) Int. Cl.
| | |
|---|---|
| *G06F 7/00* | (2006.01) |
| *G06F 17/30* | (2006.01) |
| *G06F 17/27* | (2006.01) |
| *G06F 17/22* | (2006.01) |
| *G06Q 40/00* | (2012.01) |
| *G06F 17/24* | (2006.01) |
| *G06F 17/21* | (2006.01) |

(52) U.S. Cl.
CPC .......... *G06F 17/218* (2013.01); *G06F 17/2785* (2013.01); *G06F 17/2264* (2013.01); *G06Q 40/00* (2013.01); *G06F 17/246* (2013.01); *Y10S 707/99933* (2013.01)
USPC ........... 707/736; 707/706; 707/722; 707/748; 707/758; 707/999.003

(58) Field of Classification Search
CPC .................... G06F 17/30707; G06F 17/30864; G06F 17/30598; G06F 17/30011; G06F 17/30705
See application file for complete search history.

(56) References Cited

U.S. PATENT DOCUMENTS

| | | | |
|---|---|---|---|
| 6,336,094 B1 * | 1/2002 | Ferguson et al. | 705/35 |
| 7,415,482 B2 | 8/2008 | Blake et al. | |
| 7,856,388 B1 | 12/2010 | Srivastava et al. | |
| 8,572,072 B1 * | 10/2013 | Roumeliotis | 707/722 |
| 2003/0097318 A1 * | 5/2003 | Yu et al. | 705/35 |
| 2003/0097321 A1 * | 5/2003 | Arikawa et al. | 705/35 |
| 2003/0204461 A1 | 10/2003 | Magary et al. | |
| 2008/0288541 A1 | 11/2008 | Venturini | |
| 2009/0019358 A1 | 1/2009 | Blake et al. | |
| 2009/0327243 A1 | 12/2009 | Pradhan et al. | |
| 2010/0031141 A1 * | 2/2010 | Summers et al. | 715/239 |
| 2012/0054121 A1 * | 3/2012 | Fiala et al. | 705/36 R |
| 2012/0179511 A1 * | 7/2012 | Lee et al. | 705/7.37 |

OTHER PUBLICATIONS

Ashu Bhatnagar, "Mirror, Mirror on the Wall—Which XBRL Tagging Method is Best of All?," Jun. 25, 2009, available online at http://hitachidatainteractive.com/2009/06/25/mirror-mirror-on-thewall-% E2%80%93-which-xbrl-tagging-method-is-best-of-all/.

\* cited by examiner

*Primary Examiner* — Azam Cheema
(74) *Attorney, Agent, or Firm* — Robert Plotkin, P.C.

(57) ABSTRACT

A method includes identifying a table within a first document. The method includes analyzing at least one of: a column heading in the table, a row heading in the table, and data in a cell in the table. The method includes determining, based on the analysis, that the table contains financial data classifiable according to a taxonomy. The method includes analyzing, by a classification component comprising at least one classification engine, at least one of a column heading in the table and a row heading in the table. The method includes generating, by the classification component, a classification suggestion for at least one element in the table, based on the analysis of the classification component.

62 Claims, 10 Drawing Sheets

IDENTIFYING AND SUGGESTING CLASSIFICATIONS FOR FINANCIAL DATA ACCORDING TO A TAXONOMY

BACKGROUND

The present invention relates to classifying financial information and, more particularly, to automated systems for generating classification suggestions for financial information.

In some cases, it is useful or necessary (e.g., as a result of legal requirements) to format documents according to a markup language. A variety of markup languages exist for annotating text to comply with such requirements. Various techniques exist for marking up text and other content in such markup languages, such as for the purpose of submitting the marked-up documents in the format required by a government agency. Some conventional systems, however, require a user to manually edit documents and insert the appropriate formatting and annotations. Although some conventional systems can generate at least some document annotations automatically, such systems are limited in their accuracy, flexibility, and ability to improve over time.

SUMMARY

In one aspect, methods and systems are provided to assist with the conversion of data (such as text documents or spreadsheets) into annotated documents (such as documents annotated using eXtensible Business Reporting Language (XBRL), Inline eXtensible Business Reporting Language (iXBRL) or another markup language based on Extensible Markup Language (XML)). iXBRL and XBRL are a language based on XML, XLink, and other XML-related technologies for the purpose of financial reporting, such as for reporting done by corporations to relevant government agencies in the United Kingdom, such as Her Majesty's Revenue and Customs (HMRC).

In one aspect, a method includes identifying a table within a first document. The method includes analyzing at least one of: a column heading in the table, a row heading in the table, and data in a cell in the table. The method includes determining, based on the analysis, that the table contains financial data classifiable according to a taxonomy. The method includes analyzing, by a classification component comprising at least one classification engine, at least one of a column heading in the table and a row heading in the table. The method includes generating, by the classification component, a classification suggestion for at least one element in the table, based on the analysis of the classification component.

In another aspect, a system includes an identification component and a classification component. The identification component executes on a first computing device and identifies a table within a first document. The identification component analyzes at least one of: a column heading in the table, a row heading in the table, and data in a cell in the table. The identification component determines, based on the analysis, that the table contains financial data classifiable according to a taxonomy. The classification component includes at least one classification engine and executes on a second computing device. The classification component analyzes at least one of a column heading in the table and a row heading in the table. The classification component generates a classification suggestion for at least one element in the table, based on the analysis of the classification component.

In still another aspect, a method includes displaying, by a classification component executing on a computing device, a classification suggestion for at least one element in a table containing financial data and a confidence measure associated with the classification suggestion. The method includes receiving, by the classification component, from a user of the computing device, an instruction to classify the at least one element of the table with the classification suggestion. The method includes applying, by the classification component, the classification suggestion to the at least one element of the table to produce at least one classified element of the table. The method includes generating, by the classification component, a first document including the at least one classified element of the table.

In another aspect, a method includes receiving, by a classification component, a table containing financial data for classification by one of a plurality of classification engines. The method includes determining, by an engine selection component, that the classification component lacks at least one requirement of a first of the plurality of classification engines. The method includes directing, by the engine selection component, an analysis of the table to a second of the plurality of classification engines, responsive to the determination. The method includes generating, by the second of the plurality of classification engines, a classification suggestion for at least one element in the table.

In still another aspect, a method includes receiving a user-selected subset of text in a document. The method includes identifying a second subset of text in the document associated with the user-selected subset. The method includes transmitting, to a classification component, the user-selected subset of text and the identified second subset. The method includes identifying, by the classification component, a first classification associated with a third subset of text in a second document. The method includes generating, by the classification component, a second classification suggestion based upon the identification of the first classification.

In yet another aspect, a method includes identifying a table within a document. The method includes analyzing at least one of: a column heading in the table, a row heading in the table, and data in a cell in the table. The method includes determining, based on the analysis, that the table contains financial data. The method includes analyzing, by a classification component comprising at least one classification engine, at least one of a column heading in the table and a row heading in the table. The method includes generating, by the classification component, a sign inversion suggestion for at least one element in the table, based on the analysis of the classification component.

Other features and advantages of various aspects and embodiments of the present invention will become apparent from the following description and from the claims.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

In one embodiment of the methods and systems described herein, functionality is provided for receiving data, e.g., a document generated by a conventional word processing application and for facilitating the process of tagging such data with tags that are consistent with a particular taxonomy (e.g., XBRL tags, iXBRL tags or other XML-based markup language tags), so that the resulting data are suitable for submission to a relevant agency.

Figure 1A:
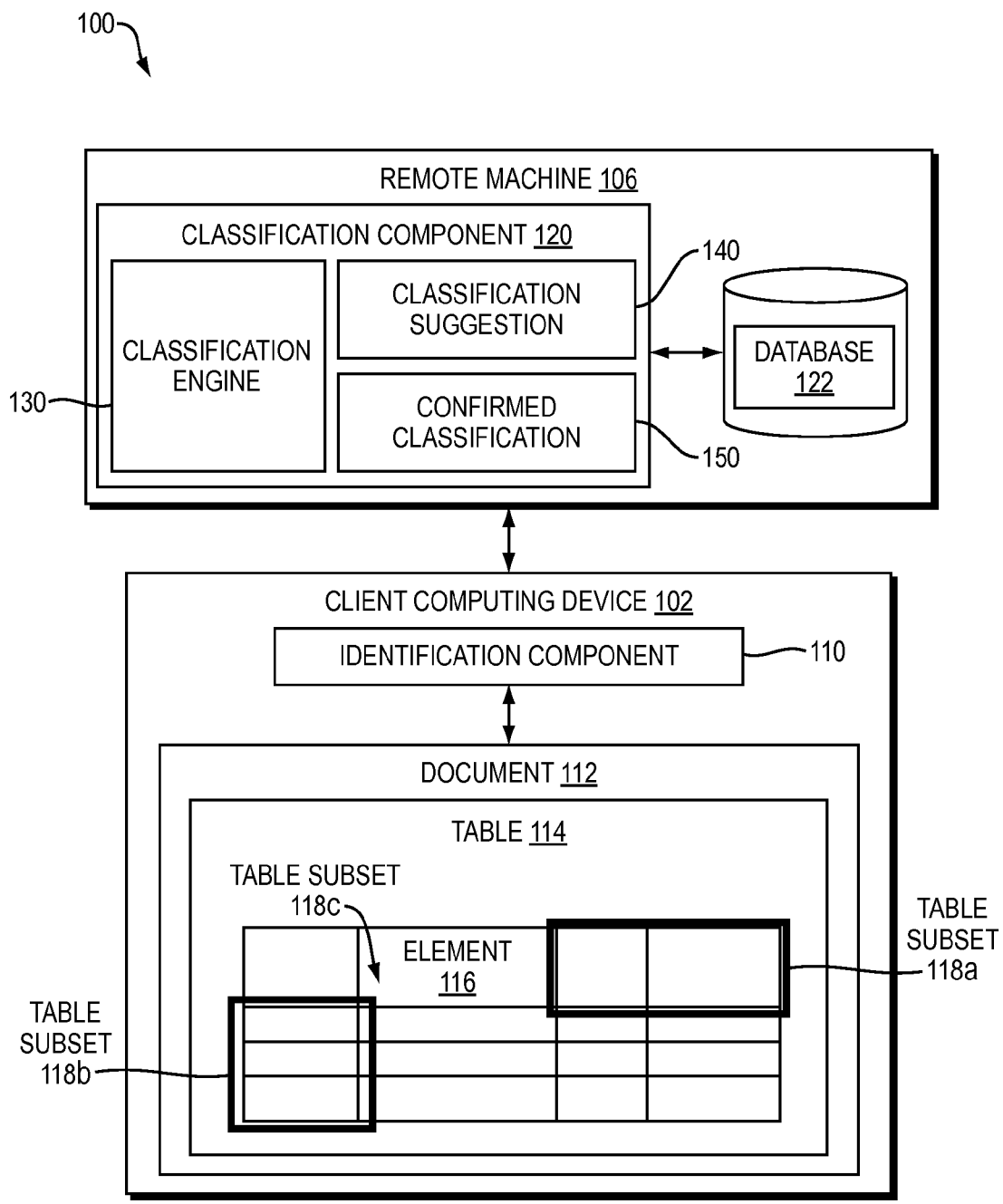
FIG. 1A is a block diagram depicting one embodiment of a system for identifying and suggesting classifications for financial data according to a taxonomy.

Referring now to FIG. 1A, a block diagram depicts one embodiment of a system 100 for identifying and suggesting classifications for financial data according to a taxonomy. Referring to FIGS. 2-3, flowcharts are shown of a method 200 and a method 300 that may be performed by the system 100 of FIG. 1A to identify and suggest classifications for financial data according to a taxonomy.

In brief overview, the system 100 includes a client computing device 102 and a remote machine 106. The system 100 includes an identification component 110, a first document 112, a table 114, a classification component 120, a database 122, and at least one classification engine 130. The table 114 includes at least one element 116 and at least one table subset 118.

In some embodiments, the identification component 110 and the classification component 120 execute on the same computing device. In other embodiments, the identification component 110 and the classification component 120 execute on different computing devices (as shown in FIG. 1A).

Before describing the methods and systems for identifying and suggesting classifications for financial data according to a taxonomy in additional detail, a description is provided of the types of computing devices with which such methods may be implemented. A client computing device 102 and a remote machine 106 (generally referred to as computing devices) can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein.

A computing device generally may include a central processing unit, main memory, a storage device, a system bus, an installation device, a network interface, an I/O controller, display devices, and one or more of a wide variety of I/O devices. The storage device may include, without limitation, an operating system and software. A computing device may also include additional optional elements, such as a memory port, a bridge, one or more input/output devices, and a cache memory in communication with the central processing unit.

A client 102 may execute, operate or otherwise provide an application, which can be any type and/or form of software, program, or executable instructions, including, without limitation, any type and/or form of web browser, web-based client, client-server application, an ActiveX control, or a Java applet, or any other type and/or form of executable instructions capable of executing on client 102.

In one embodiment, a computing device 106 provides functionality of a web server. In some embodiments, a web server 106 comprises an open-source web server, such as the APACHE servers maintained by the Apache Software Foundation of Delaware. In other embodiments, the web server 106 executes proprietary software, such as the Internet Information Services products provided by Microsoft Corporation of Redmond, Wash., the Oracle iPlanet web server products provided by Oracle Corporation of Redwood Shores, Calif., or the BEA WEBLOGIC products provided by BEA Systems, of Santa Clara, Calif.

Furthermore, the computing device may include a network interface to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). The network interface may comprise a built-in network adapter, network interface card, PCMCIA network card, card bus network adapter, wireless network adapter, USB network adapter, modem or any other device suitable for interfacing the computing device to any type of network capable of communication and performing the operations described herein.

Although FIG. 1A shows a direct connection between the client computing device 102 and the remote machines 106, the client 102 and the remote machine 106 may be on either the same network or there may be multiple networks between the client 102 and the remote machine 106. The network can be a local-area network (LAN), such as a company Intranet, a metropolitan area network (MAN), or a wide area network (WAN), such as the Internet or the World Wide Web.

A computing device typically operates under the control of operating systems, which control scheduling of tasks and access to system resources. The computing device can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7 and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

Figure 2A:
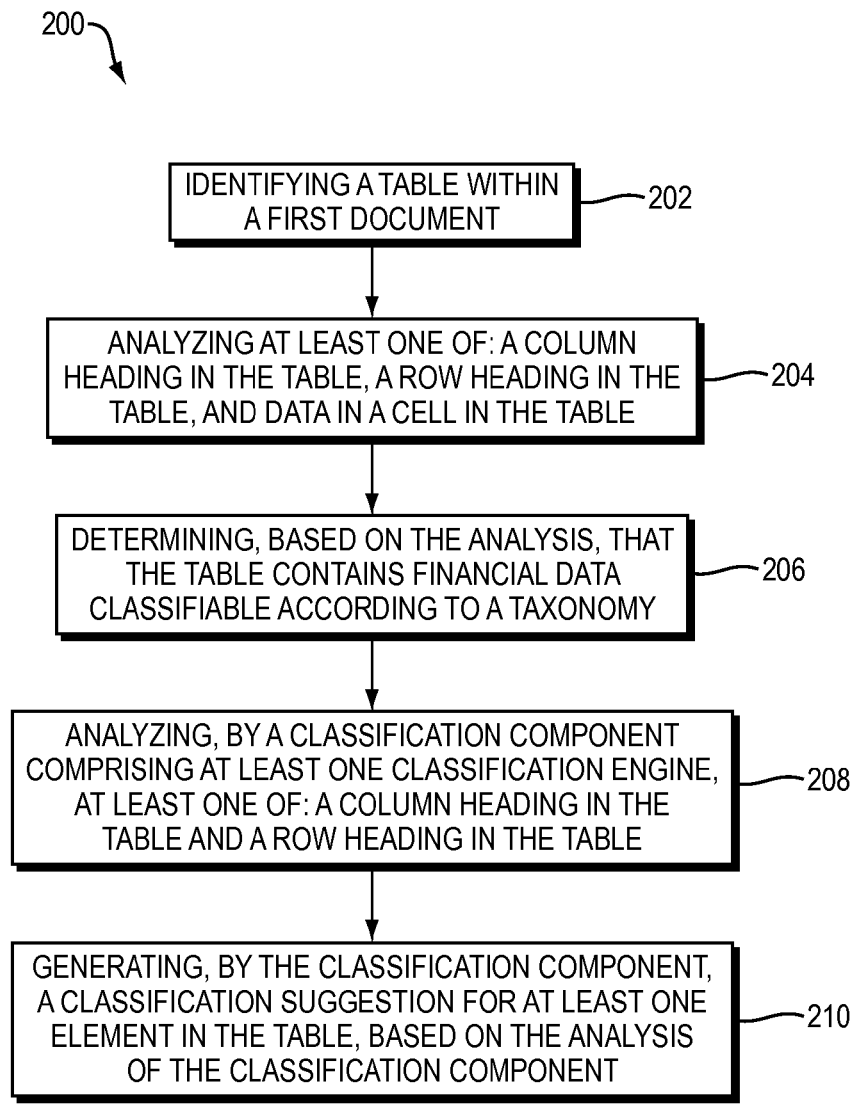
FIG. 2A is a flow diagram depicting one embodiment of a method for identifying and suggesting classifications for financial data according to a taxonomy.

Referring now to FIG. 2A, a flow diagram depicts one embodiment of a method 200 for identifying and suggesting classifications for financial data according to a taxonomy. In brief overview, the method 200 includes identifying a table within a first document (202). The method 200 includes analyzing at least one of: a column heading in the table, a row heading in the table, and data in a cell in the table (204). The method 200 includes determining, based on the analysis, that the table contains financial data classifiable according to a taxonomy (206). The method 200 includes analyzing, by a classification component comprising at least one classification engine, at least one of: a column heading in the table and a row heading in the table (208). The method 200 includes generating, by the classification component, a classification suggestion for at least one element in the table, based on the analysis of the classification component (210).

Referring now to FIG. 2A in greater detail, and in connection with FIG. 1A, the method 200 includes identifying a table within a first document (202). In one embodiment, the identification component 110 identifies the table 114. A table 114 may be provided as any logical table of data and is not limited to a table as provided by any specific word processing application or spreadsheet application. In some embodiments, a table 114 is provided as a tab-delimited table. In one embodiment, the identification component 110 is a software agent in communication with a word processing application. For example, the identification component 110 may be a stand-alone software application executing on the client computing device 102 and that is in communication with the word processing application that processes the first document 112. As another example, the identification component 110 may be a software application executing on a remote machine 106 and receiving the first document 112 from the client computing device 102 over a network—for example, the identification component 110 may be a web-based application. In another embodiment, the identification component 110 is embedded into the word processing application. For example, the identification component 110 may be a plug-in that a user adds to the word processing application, or a word processing application may include the functionality of the identification component 110.

In other embodiments, the classification component 120 identifies the table 114. In further embodiments, a word processing application processing the first document 112 and displaying it to the user includes functionality for automatically identifying the table 114.

In one embodiment, the identification component 110 executes on the client computing device 102. In some embodiments, the document 112 and the component analyzing the document 112 reside on the same computing device. In other embodiments, a user of the client computing device 102 transmits the document 112 to the remote machine 106 for analysis.

In some embodiments, before identifying the table, the identification component 110 converts the document 112 from a first format into another format; for example, the document may be a word processing document and the identification component 110 may convert it into a document formatted according to the eXtensible Business Reporting Language (XBRL) or a derivative of XBRL, such as the Inline eXtensible Business Reporting Language (iXBRL). In other embodiments, the identification component 110 normalizes the text in the document 112 before processing (e.g., by removing white space, standardizing capitalization, etc.).

In some embodiments, before identifying the table, the identification component 110 receives an identification of a taxonomy from a user. In one embodiment, the identification component 110 includes functionality for receiving (e.g., from a user) an identification of a taxonomy with which to classify financial data. For example, the identification component 110 may include a user interface displaying a plurality of taxonomies and with which a user may select a taxonomy for use in classifying financial data. As another example, the identification component 110 may include a user interface such as a text box into which a user may provide an identification of a taxonomy for use in classifying financial data. Taxonomies may include one or more classifications of financial data and specify identifiers (also referred to as tags) that can be associated with financial data to classify the financial data; common examples of taxonomies include, for example and without limitation, the US Generally Accepted Accounting Principles taxonomy, the UK Generally Accepted Accounting Principles taxonomy, the UK International Financial Reporting Standard taxonomy, and the more general International Financial Reporting Standard taxonomy. Different agencies may require the use of different taxonomies to classify financial data and different kinds of filings within a single agency may require the use of different taxonomies.

Figures 2B, 2C:
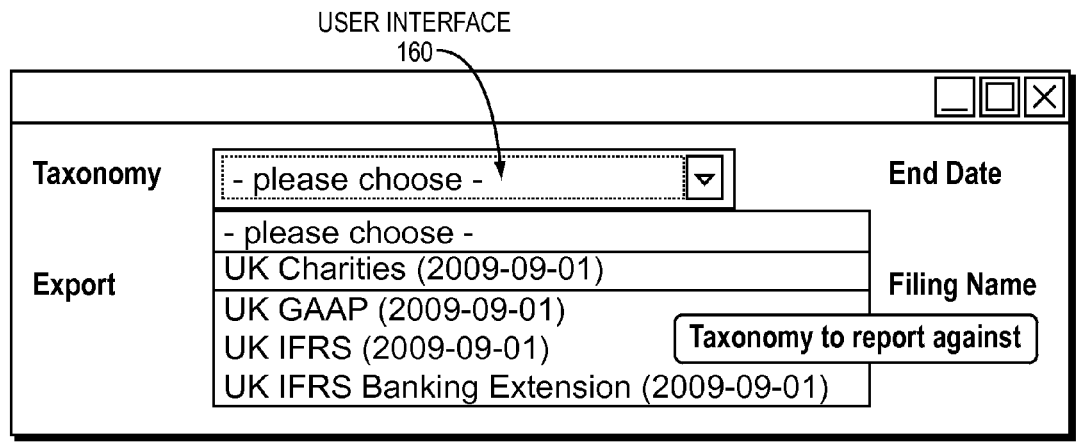
FIG. 2B is a screen shot depicting an embodiment of a user interface for receiving an identification of a taxonomy.
FIG. 2C is a screen shot depicting one embodiment of a plurality of classification suggestions generated for a table subset.

Referring now to FIG. 2B, a screen shot depicts one embodiment of a user interface for receiving an identification of a taxonomy. As shown in FIG. 2B, a user interface 160 enumerates a plurality of taxonomies from which the user may select the taxonomy that the classification component 120 should use in classifying the table 114.

Referring again to FIG. 2A, and in one embodiment, the presence of a code or annotation within the first document 112 enables the identification component 110 to identify that data within the document 112 constitutes a table 114; for example, a tag in a markup language that identifies tables (e.g., "<table>") may precede the table 114. In another embodiment, the identification component 110 identifies data in the first document 112 as data that forms a row heading or a column heading. In some embodiments, the identification component 110 uses a color-coding scheme to determine which tables may include financial data.

The method 200 includes analyzing at least one of: a column heading in the table, a row heading in the table, and data in a cell in the table (204). In one embodiment, the identification component 110 analyzes the at least one of: a column heading in the table, a row heading in the table, and data in a cell in the table. In another embodiment, the classification component 120 performs this analysis. In still another embodiment, a word processing application processing the first document 112 and displaying it to the user includes functionality for performing this analysis.

In one embodiment, a heading of a column or a row need not be directly adjacent to the column or row it describes. In another embodiment, a heading of a column or row may itself span multiple columns or multiple rows. For example, heading information may be included in a cell that spans multiple columns or multiple rows. In still another embodiment, the identification component 110 analyzes at least two of: a column heading in the table, a row heading in the table, and data in a cell in the table. In yet another embodiment, the identification component 110 analyzes a column heading in the table, a row heading in the table, and data in a cell in the table.

The method 200 includes determining, based on the analysis, that the table contains financial data classifiable according to a taxonomy (206). In one embodiment, the identification component 110 determines that the table contains financial data. In another embodiment, the classification component 120 determines that the table contains financial data. In still another embodiment, a word processing application processing the first document 112 and displaying it to the user includes functionality for determining that the table contains financial data. In some embodiments, the analysis of the heading data results in a set of conclusions about whether each table 114 in the document 112 is likely to contain financial data.

In one embodiment, the identification component 110 determines that the table 114 contains a date indicative of financial data. In another embodiment, the identification component 110 determines that the table 114 contains at least one character indicative of financial data; for example, the identification component 110 may determine that the table 114 includes a dollar sign, a euro sign, a comma or a period. In still another embodiment, the identification component 110 determines that the table 114 contains a number indicative of financial data; for example, the identification component 110 may determine that the table 114 includes numbers including decimal points indicative of dollar amounts. In yet another embodiment, the identification component 110 determines that text in a heading is indicative of financial data; for example, the heading may include text labeling the data in the columns or rows that follow as "revenue", "costs, "profits", or other such labels indicative of financial data. In some embodiments, the identification component 110 receives an identification of the taxonomy. In one of these embodiments, the identification component 110 uses the identification of the taxonomy in the analysis.

In one embodiment, the table 114 is transmitted to the classification component 120, based on the determination that the table 114 contains financial data classifiable according to a taxonomy. The identification component 110 may include functionality for extracting a table 114 from the first document 112 and transmitting it to the classification component 120 for further analysis. In another embodiment, the identification component 110 includes functionality for modifying the first document 112; for example, the identification component 110 may insert an annotation into the first document 112 to identify the table 114 within the first document 112 as a table containing financial data, responsive to the determination that the table contains financial data. In still another embodiment, the identification component 110 includes functionality for transmitting data, such as an extracted table or an annotated version of the document 112, to the classification component 120. For instance, the identification component 110 may include communications software that instructs the client computing device 102 to transmit data (e.g., the table 114 or an annotated version of the first document 112) to the classification component 120.

The method 200 includes analyzing, by a classification component comprising at least one classification engine, at least one of: a column heading in the table and a row heading in the table (208). In one embodiment, the classification component 120 executes on the remote machine 106. In another embodiment, the classification component 120 receives a table 114 identified by the identification component 110 as containing financial data; the classification component 120 analyzes at least one element 116 of the table 114 to generate a classification suggestion 140 for the at least one element 116 of the table 114. In some embodiments, and as will be discussed in further detail in connection with FIGS. 4A-4B below, the classification component 120 executes one or more classification engines 130 to perform the analysis and generate the classification suggestion 140. In one of these embodiments, the classification component 120 may extract data from a heading in the table 114 and provides the extracted data to the classification engine 130 for analysis.

In one embodiment, the classification engine 130 is a machine learning engine, such as, for example, Machine Learning and Classification (MALAC) engine. In another embodiment, the classification engine 130 is the Machine Learning for LanguagE Toolkit (MALLET) document classification engine, distributed by Andrew Kachites McCallum of the University of Massachusetts at Amherst. In another embodiment, the classification engine 130 is a search engine such as the LUCENE engine distributed by The Apache Software Foundation. In still another embodiment, the classification engine 130 may, for example, be a publicly available, open source engine, a proprietary engine, or a combination of both.

In another embodiment, the classification component 120 only analyzes a table 114 that was identified as likely to contain financial data. In still another embodiment, the classification component 120 performs the analysis of at least one heading in the table 114 without analyzing data contained in the cells of the table; that is, the classification component 120 does not need to evaluate any of the content of the cells as part of operation 208.

The method 200 includes generating, by the classification component 120, a classification suggestion for at least one element in the table, based on the analysis of the classification component 120 (210). In one embodiment, the classification component 120 executes a classification engine 130 to identify at least one classification matching at least one of a column heading in the table and a row heading in the table.

In one embodiment, the classification component 120 analyzes text in the column heading or the row heading and attempts to identify similar text within the taxonomy selected by the user. In some embodiments, the classification component compares the column heading text with the taxonomy text by using statistical analysis. For example, and without limitation, the classification component 120 may determine that a heading includes the text "operating expense" and attempt to identify a classification within the taxonomy that includes the text "operating expense"; the classification component 120 may first identify a root or stem of the text in the heading and identify a classification within the taxonomy that includes the stem, or other similar text. In some embodiments, the classification component 120 may generate classification suggestions 140 based at least in part on any one or more of the following: the content of the column or row headings (e.g., dates or text within the headings), the taxonomy from which the suggestion should be selected, a title of the document 112, and the context in which the table 114 appears (e.g., the text above, below, or to the left or right of the table 114 within the document 112).

In one embodiment, the classification component 120 executes a statistical process to identify at least one classification matching at least one of a column heading in the table and a row heading in the table. In another embodiment, the classification component 120 generates a confidence measure indicating a level of accuracy of the classification suggestion 140. For example, the confidence measure may be a non-binary number, e.g., a real number (e.g., any real number within the range of 0-1), such as a percentage (e.g., any percentage from 0%-100%), representing the degree of confidence in the generated classification suggestion 140. In still another embodiment, the classification component 120 associates the classification suggestion 140 with the confidence measure.

In one embodiment, the classification component 120 generates a classification suggestion 140 selected from the taxonomy. In another embodiment, the classification component 120 generates a classification suggestion 140 for a plurality of cells in the table, based on its analysis; that is, the classification suggestion 140 may be associated with one or more corresponding elements 116 in the table 114, which may be referred to as a table subset 118. The table subset 118 may include, without limitation, a single element 116, a row containing a plurality of cells, a column containing a plurality of cells, a portion of a row, a portion of a column, multiple rows, and multiple columns.

In some embodiments, the classification component 120 stores the correspondence between a classification suggestion and one or more table elements (e.g., in the database 122). By way of example, and without limitation, the classification component 120 may analyze a heading containing the text "operating expenses" and generate, based on that analysis, a classification suggestion that each of the cells in the row or column associated with the heading be classified as an operating expense (for example, by associating the cell with a tag specified in the taxonomy).

In some embodiments, the classification component 120 generates more than one classification suggestion 140; for example, the classification component 120 may generate multiple classification suggestions that are each associated with the same table subset 118. In one of these embodiments, the classification component 120 associates a confidence measure with each generated classification suggestion 140. The confidence measures associated with distinct classification suggestions 140 may be the same as or differ from each other. In another of these embodiments, the confidence measures assist a user in selecting a classification suggestion 140 to apply to an element 116 of the table 114. For example, after analyzing a heading that includes the text "operating expense", the classification component 120 may generate a list of two suggested classifications from the taxonomy: 1) an "operating expense" classification with a confidence measure of 97.8%, and 2) an "expenses" tag with a confidence measure of 2.2%.

Referring now to FIG. 2C, a screen shot depicts one embodiment of a plurality of classification suggestions generated for a table subset 118. As shown in FIG. 2C, the classification component 120 generated a plurality of classification suggestions 140a-d for a table subset 118. In the embodiment depicted in FIG. 2C, each classification suggestion is associated with a confidence measure (75.3% for classification suggestion 140a, 24.1% for classification suggestion 140b, 0.3% for classification suggestion 140c, and 0.1% for classification suggestion 140d.

Referring back to FIG. 2A, in some embodiments, the classification component 120 stores data, such as classification suggestions, tables, and user instructions regarding whether to apply a classification suggestion to a table element in a database 122. In some embodiments, the database 122 is an ODBC-compliant database. For example, the database 122 may be provided as an ORACLE database, manufactured by Oracle Corporation of Redwood Shores, Calif. In other embodiments, the database 122 can be a Microsoft ACCESS database or a Microsoft SQL Server database, manufactured by Microsoft Corporation of Redmond, Wash. In still other embodiments, the database 122 may be a custom-designed database based on an open source database, such as the MYSQL family of freely available database products distributed by MySQL AB Corporation of Uppsala, Sweden. In further embodiments, the functionality provided by the database 122 may be provided by any form of persistent storage.

In one embodiment, and as will be discussed in further detail in connection with FIG. 3A below, the user of the client computing device 102 is presented with the classification suggestion 140 and any associated confidence measure; the user determines whether to apply the classification suggestion 140 to the table subset 118. In such an embodiment, the system 100 may include a user interface that displays data received from the classification component 120 (e.g., the generated classification suggestion 140) to the user; via the user interface, a user may confirm the application of a classification suggestion 140 to the table subset 118, may modify a classification suggestion 140 and then confirm the application of the modified classification suggestion 140 to the table subset 118, or reject a classification suggestion 140. In some embodiments, the classification component 120 includes the user interface that displays the data the classification component 120 generated. In other embodiments, the identification component 110 includes the user interface.

A user may instruct the classification component 120 to modify the classification suggestion 140 instead of, or in addition to, a separate instruction to apply the classification suggestion to the table subset 118; if the instruction is an instruction to modify, the classification component 120 may treat the instruction as both an instruction to modify and an instruction to classify. After a user confirms the application of a classification suggestion 140, and regardless of whether the user requested a modification to the classification suggestion 140, the system 100 may store the classification suggestion 140 as a confirmed classification 150; if the user requested a modification to the classification suggestion 140, the system 100 may also store the modification.

In one embodiment, the classification component 120 applies the confirmed classification 150 to the corresponding table element(s) 116 in the table subset 118. The classification component 120 may, for example, generate a second document that includes the table subset 118, the classification suggestion 140, the associated confidence measure, and an indication of whether a user confirmed the application of the classification suggestion 140 to the table subset 118. In another embodiment, the classification component 120 modifies the first document 112 to include the classification suggestion 140, the associated confidence measure, and an indication of whether a user confirmed the application of the classification suggestion 140 with the table subset 118.

In some embodiments, the classification component 120 stores (e.g., in the database 122) a classification suggestion 140. In other embodiments, the classification component 120 stores the indication of whether the user confirmed the application of the classification suggestion 140. In still other embodiments, the classification suggestion 140 as a confirmed classification 150. In further embodiments, the classification component 120 uses previously stored indications to generate future classification suggestions.

In some embodiments, use of the methods and systems described herein allow users to cause a system to review documents potentially containing financial data, identify tables within the documents likely to include financial data, analyze data in the tables to generate classification suggestions, and provide the user with a listing of generated classification suggestions as well as an indication of a level of confidence associated with each suggestion. In one of these embodiments, the user need not personally review each table and attempt to manually identify an appropriate classification and is able to spend less time on the classification process. In another of these embodiments, the result of this process is the modification of a document containing financial data, or generation of a new document, in which the financial data has been classified according to a user-specified taxonomy and is suitable for submission to an entity requiring that submissions comply with various taxonomies. In still another of these embodiments, the user may review a rendering of the classified document over the Internet and submit the document to relevant entities electronically.

Figure 3A:
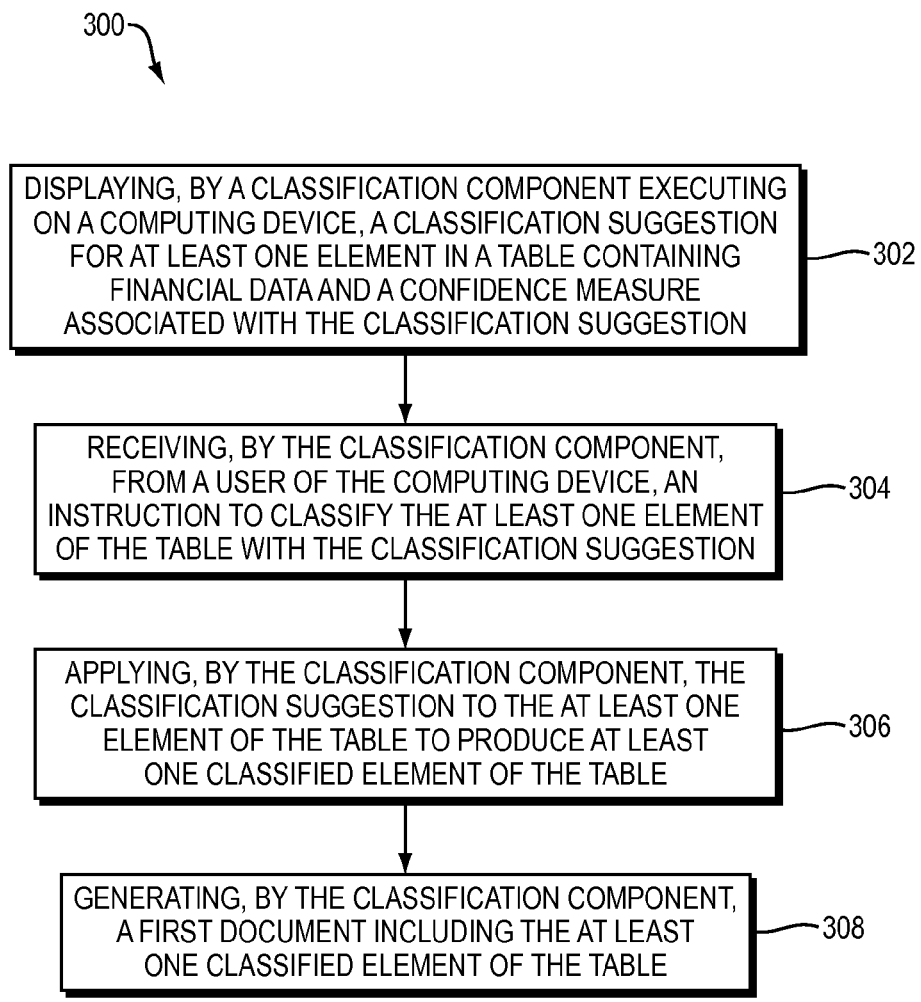
FIG. 3A is a flow diagram depicting an embodiment of a method for applying a classification suggestion to at least one element in a table.

Referring now to FIG. 3A, a flow diagram depicts one embodiment of a method for applying a classification suggestion to at least one element in a table. In brief overview, a method 300 includes displaying, by a classification component executing on a computing device, a classification suggestion for at least one element in a table containing financial data and a confidence measure associated with the classification suggestion (302). The method includes receiving, by the classification component from a user of the computing device, an instruction to classify the at least one element of the table with the classification suggestion (304). The method includes applying, by the classification component, the classification suggestion to the at least one element of the table to produce at least one classified element of the table (306). The method includes generating by the classification component, a first document including the at least one classified element of the table (308).

Referring now to FIG. 3A in greater detail, and in connection with FIG. 1A, the method 300 includes displaying, by a classification component executing on a computing device, a classification suggestion for at least one element in a table containing financial data and a confidence measure associated with the classification suggestion (302). In one embodiment, the classification component 120 displays a second classification 140b with a second confidence measure.

The classification component receives, from a user of the computing device, an instruction to classify the at least one element of the table with the classification suggestion (304). In one embodiment, the classification component 120 receives an instruction, from the user, to modify the classification suggestion 140 prior to classifying the table subset 118 with the classification suggestion 140. After receiving the instruction, the classification component 120 may store the classification suggestion 140 as a confirmed classification 150.

Figure 1B:
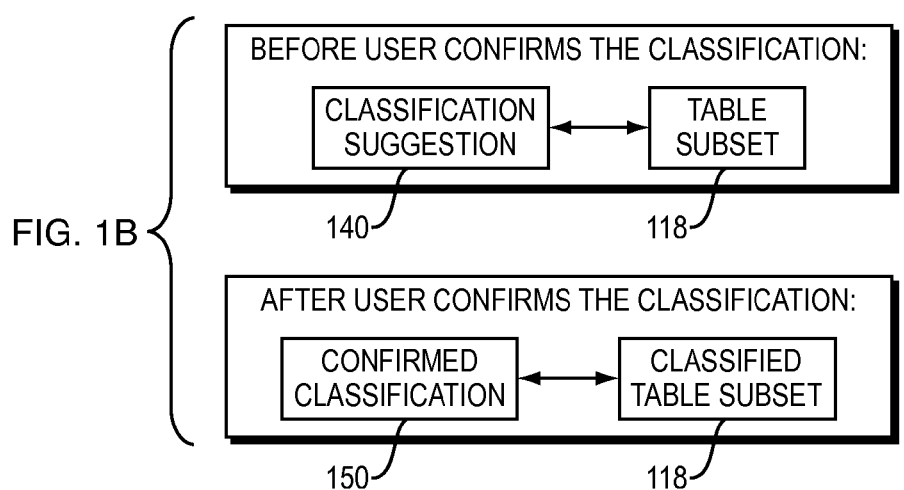
FIG. 1B is a block diagram depicting a classification suggestion associated with a table element and a confirmed classification associated with a classified table subset.

Referring still to FIG. 3A, and in connection with FIG. 1B, the classification component initially associates a classification suggestion 140 with a table subset 118. The classification component applies the classification suggestion to the at least one element of the table to produce at least one classified element of the table (306). In one embodiment, after a user instructs the classification component 120 to apply the classification suggestion 140, the classification component 120 saves a copy of the classification suggestion 140 as a confirmed classification 150 and associates the confirmed classification 150 with the table subset 118 to produce a classified table subset 118. The table subset 118 may include one or more elements 116; for example, as shown in FIG. 1A, a table subset 118a includes a portion of a row in the table 114, a table subset 118b includes an entire column, while a table subset 118c includes one cell (element 116) in the table 114. In another embodiment, the classification component 120 modifies one or more cells in the table 114 to include an identification of the confirmed classification 150 (for example, and without limitation, by inserting a tag selected from an XBRL taxonomy into one or more cells). In some embodiments, the table subset 118 includes cells from multiple tables 114. In other embodiments, the table subset 118 includes multiple tables 114 in their entirety. In further embodiments, the table subset 118 includes multiple tables 114 from multiple documents 112.

Figure 3B:
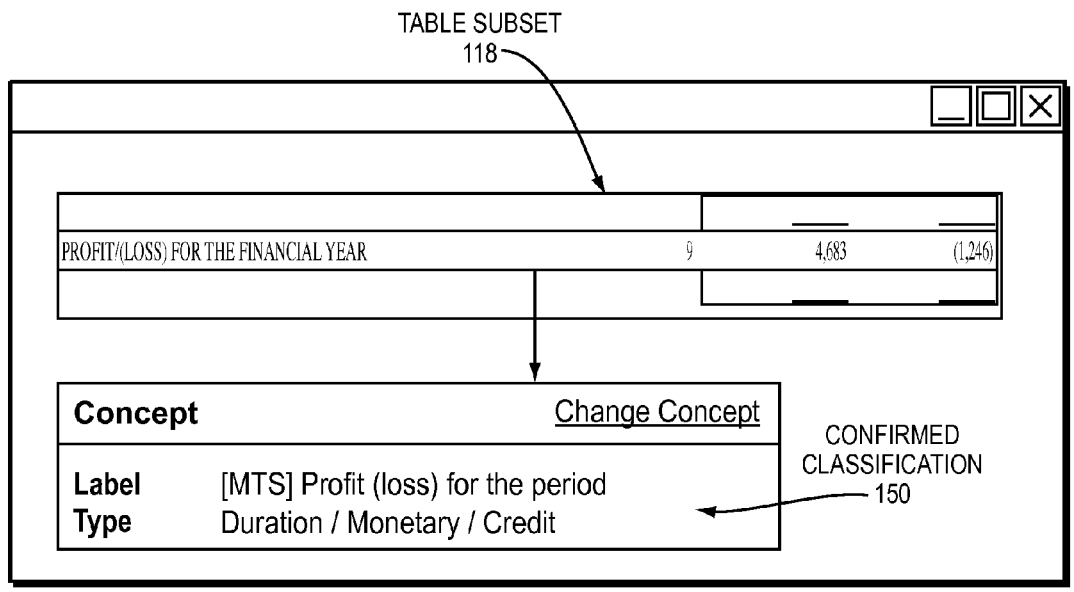
FIG. 3B is a screen shot depicting one embodiment of a confirmed classification associated with a table subset.

Referring to FIG. 3B, a screen shot depicts one embodiment of a confirmed classification associated with a table subset. As shown in FIG. 3B, the table subset 118 is shown with a confirmed classification 150 ("Label [MTS] Profit (loss) for the period"), instead of with the plurality of classification suggestions 140.

Figure 3C:
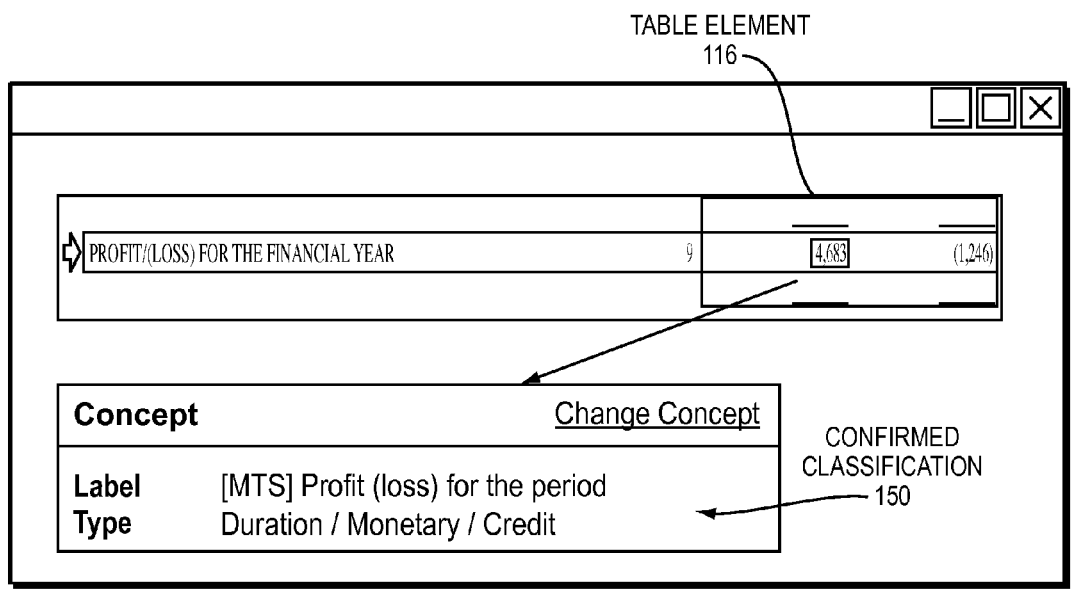
FIG. 3C is a screen shot depicting one embodiment of a confirmed classification associated with an element in a table.

Referring now to FIG. 3C, a screen shot depicts one embodiment of a confirmed classification associated with an element in a table. In one embodiment, when a user confirms the application of a classification suggestion 140 for a table subset 118, the classification component 120 associated each element 116 within the table subset 118 with the confirmed classification 150. As shown in FIG. 3C, when a user views information associated with the element 116, the system displays the confirmed classification 150.

Referring back to FIG. 3A, the classification component generates a first document including the at least one classified element of the table (308). In one embodiment, the classification component 120 generates a first document including the at least one element 116, the classification suggestion 140, the confidence measure, the confirmed classification 150, and the at least one classified element; for example, the classification component 120 may provide a spreadsheet listing one or more elements analyzed, classification suggestions 140 and the confidence measure associated with each, an indication of whether the user applied the classification suggestions to the elements and, if so, the classified elements and confirmed suggestions 150.

In some embodiments, instead of generating a new document, the classification component 120 modifies an existing document 112. In one embodiment, the classification component 120 receives the first document 112 including the table subset 118 to be classified and generates the classification suggestion 140 as described above in connection with FIGS. 1-2 before displaying the classification suggestion 140 to the user. In another embodiment, the classification component 120 modifies the first document 112 to include the classified table subset 118.

In some embodiments, the classification component 120 stores separate records for classification suggestions 140 and for confirmed classifications 150. In one of these embodiments, the classification component 120 may later access these records in generating new classification suggestions 140; by tracking which classification suggestions 140 were accepted, accepted with modifications, or rejected, the classification component 120 may improve future classification suggestions 140. In another of these embodiments, the classification component 120 may later access these records to calculate statistics such as, without limitation, how frequently users adopt classification suggestions 140 and how frequently users modify classification suggestions 140 to create a classification that was not previously available to the classification component 120.

In one embodiment, the classification component 120 displays a first classification suggestion 140a and a second classification suggestion 140b to a user and receives an instruction including a selection of one of the two classification suggestions 140. In this embodiment, the classification component 120 applies the selected one of the two classification suggestions 140 to the table subset 118, which is then referred to as a classified table subset.

In some embodiments, the classification component 120 takes user instructions into account when generating classification suggestions 140. In one of these embodiments, the classification component 120 displays a second classification suggestion 140b for at least one element in a second table 114b containing financial data, with a second confidence measure, the second classification suggestion 140b based at least in part on the received user instruction.

In one embodiment, the classification component 120 receives an identification of a user requirement for classified elements. In another embodiment, the classification component 120 reviews a document containing at least one classified element. In still another embodiment, the classification component 120 determines that the document containing the at least one classified element does not satisfy the user requirement. In such an embodiment, the classification component 120 generates an additional element that satisfies the user requirement. For example, and without limitation, a user may instruct the classification component 120 to include in a document containing classified elements a particular element (e.g., the name of a director or an activity level of a company). In one embodiment, the classification component 120 receives, from the user, input identifying a requirement of the user; the classification component 120 reviews the document including the user-approved classified element and determines that the requirement (e.g., a required identification of a director or of an activity level of a company) is missing—for instance, the user preparing the document 112 may have forgotten to include that element. The classification component 120 can generate the missing element and in this way reduce unnecessary warnings about missing elements later or rejection of the document by an entity to which the user tries to submit a document with the classified element but that does not satisfy the user requirement. In some embodiments, the user provides the input identifying the requirement before the classification component 120 analyzes the table 114. For example, the user may provide the input identifying the requirement when the user specifies a taxonomy for use in classifying the table 114.

Figure 4A:
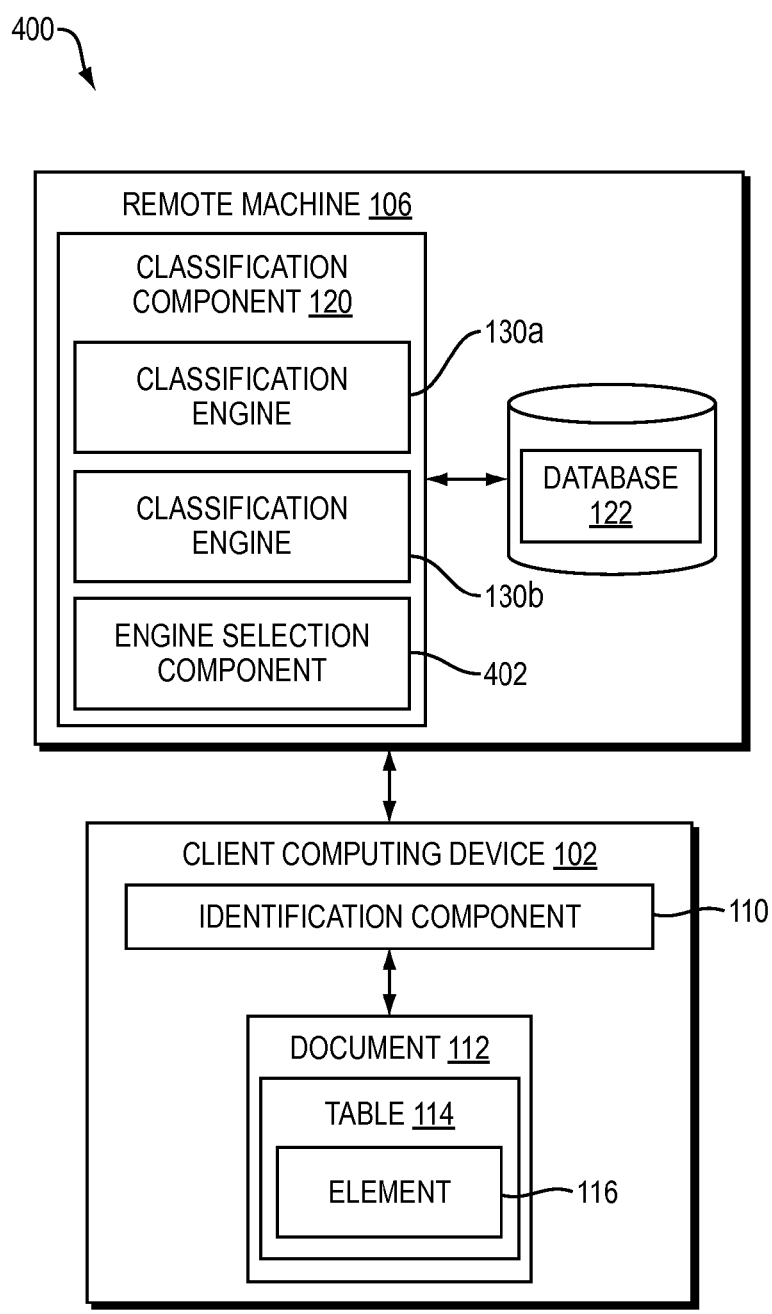
FIG. 4A is a block diagram depicting an embodiment of a system for generating, by a classification component including a plurality of classification engines, classification suggestions.

Referring now to FIG. 4A, a block diagram depicts an embodiment of a system for generating, by a classification component including a plurality of classification engines, classification suggestions. In brief overview, a system 400 includes a client computing device 102, a remote machine 106, an identification component 110, a document 112, a table 114, a classification component 120, a first classification engine 130a, a second classification engine 130b, an engine selection component 402, and a database 122. The client computing device 102, remote machine 106, document 112, table 114, classification component 120, database 122, and classification engines 130a-b, may be provided as described above in connection with FIG. 1A.

Figure 4B:
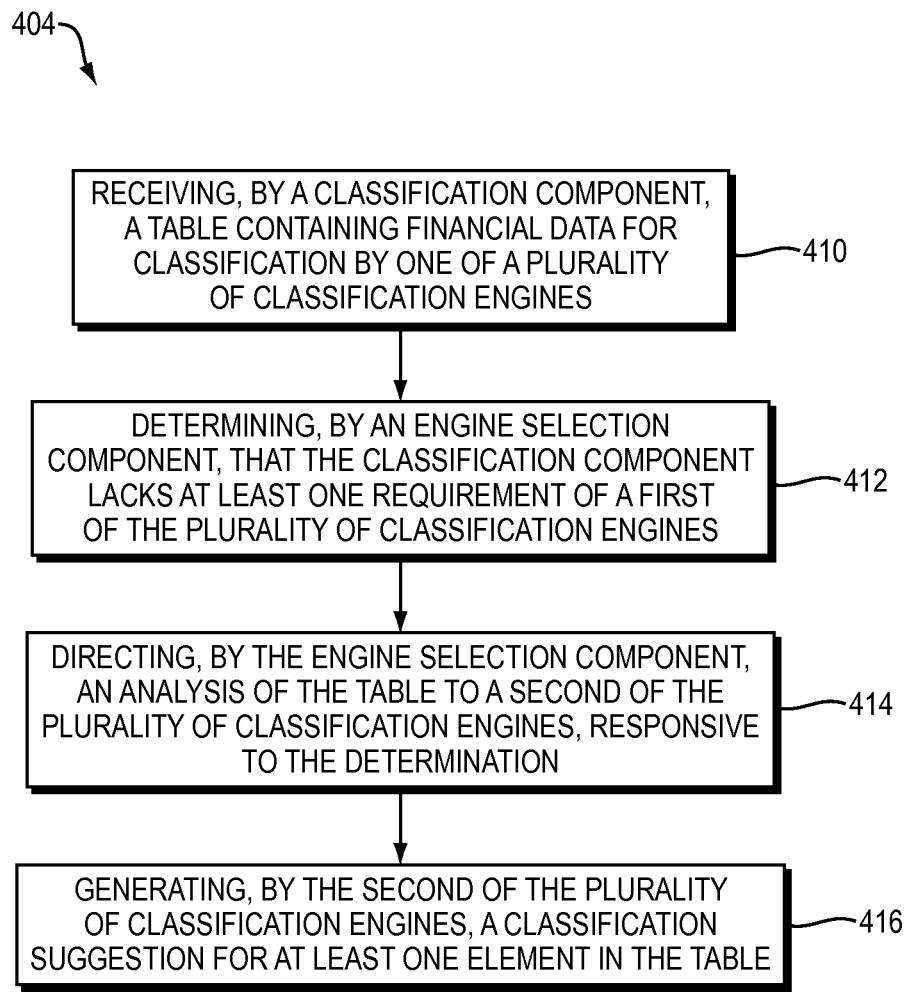
FIG. 4B is a flow diagram depicting an embodiment of a method for generating, by a classification component including a plurality of classification engines, classification suggestions.

Referring now to FIG. 4B, a flow diagram depicts an embodiment of a method 404 for generating classification suggestions by a classification component including a plurality of classification engines. In brief overview, the method 404 includes receiving, by a classification component, a table containing financial data for classification by one of a plurality of classification (410). The method includes determining, by an engine selection component, that the classification component lacks at least one requirement of a first of the plurality of classification engines (412). The method includes directing, by the engine selection component, an analysis of the table to a second of the plurality of classification engines, responsive to the determination (414). The method includes generating, by the second of the plurality of classification engines, a classification suggestion for at least one element in the table (416).

Referring now to FIG. 4B in greater detail, and in connection with FIGS. 1A and 4A, a classification component receives a table containing financial data for classification by one of a plurality of classification engines (410). In one embodiment, the classification component 120 executes on the remote machine 106 and receives the table 114 from the identification component 110. In another embodiment, the classification component 120 receives the table 114, an identification of a taxonomy from which the classifications should be selected, and a context for the table (e.g., any date period related to the table 114, title or heading information from the document 112, any subheadings, and text from the lines above and below the table 114 in the document 112).

The engine selection component 402 executes on the remote machine 106 and identifies one of a plurality of classification engines 130 that can analyze the received table 114 and generate classification suggestions 140 for a table subset 118.

The engine selection component determines that the classification component lacks at least one requirement of a first of the plurality of classification engines (412). In one embodiment, the engine selection component 402 analyzes a set of records stored by, for example, the classification component 120 or the database 122, each record in the set of records identifying a user instruction to apply a second classification suggestion 140b to a second table 114b. Some classification engines 130 may require, by way of example, that the classification component 120 have stored a number of previous user instructions regarding whether to accept classification suggestions 140. By accessing the database 122 and analyzing a number of instructions previously stored in the database 122, the engine selection component 402 can determine whether the classification component 120 satisfies the requirements of a particular classification engine 130. In another embodiment, the engine selection component 402 determines that the set of records stored by the classification component 120 contains a number of records less than a number required by the first of the plurality of classification engines 130; for example, the engine selection component 402 may query the database 122 to determine how many, if any, records of user instructions to apply classification suggestions are available.

The engine selection component directs an analysis of the table to a second of the plurality of classification engines, responsive to the determination (414). In some embodiments, the engine selection component 402 directs the analysis to a machine learning engine. In other embodiments, the engine selection component 402 directs the analysis to an engine other than a machine learning engine; for example, the engine selection component 402 may direct the analysis to a search engine or to an engine that may provide classification suggestions ranked according to an arbitrary scale as opposed to classification suggestions associated with confidence measures.

The second of the plurality of classification engines generates a classification suggestion for at least one element in the table (416). As users receive generated classification suggestions 140 over time and provide indications of whether or not to accept the classification suggestions 140, the classification component 202 may generate a set of records with user indications that may result in the use of more sophisticated classification engines for generation of subsequent classification suggestions 140.

In some embodiments, the classification component 120 modifies a plurality of classification suggestions 140 generated by a classification engine 130. In one of these embodiments, the classification component 120 filters out one of the plurality of classification suggestions 140 that does not satisfy a user requirement for classification suggestions 140. For example, a user may have specified a particular date range be considered in suggesting classifications or that a particular format be returned (e.g., only numeric classifications should be suggested). In another of these embodiments, the classification component 120 performs XBRL-based filtering on the output of the classification engine 130 before providing the classification suggestion 140 to a user.

In another embodiment, the classification component 120 receives a second table 114b containing financial data for classification by one of the plurality of classification engines 130. In this embodiment, the engine selection component 402 determines that the classification component 120 satisfies at least one requirement of the first of the plurality of classification 130 and directs the analysis of the second table 114b to the first classification engine 130a, responsive to the determination; the first classification engine 130a generates a classification suggestion 140 for at least one element in the second table 114b.

In some embodiments, the engine selection component 402 directs the analysis of the table 114 to the classification engine 130b, which generates a classification suggestion 140 and a confidence measure. In one of these embodiments, the engine selection component 402 determines that the confidence measure for the generated classification falls beneath a threshold and instructs a second classification engine 130a to perform a second analysis of the table 114; classification suggestions 140 generated by either or both classification engines 130 may be presented to a user for confirmation. In another of these embodiments, the engine selection component 402 directs the analysis of the table 114 to two classification engines 130; the classification component 120 receives, from a classification engine 130a, at least one classification suggestion 140a and at least one confidence measure, and receives, from a classification engine 130b, at least one classification suggestion 140b ranked according to an arbitrary scale. In this still another of these embodiments, the classification component 120 maps the rankings from the classification engine 130b onto the confidence measures received from the classification engine 130a and then merges the results of the two types of classifications, providing a unified set of classification suggestions 140.

Figure 5:
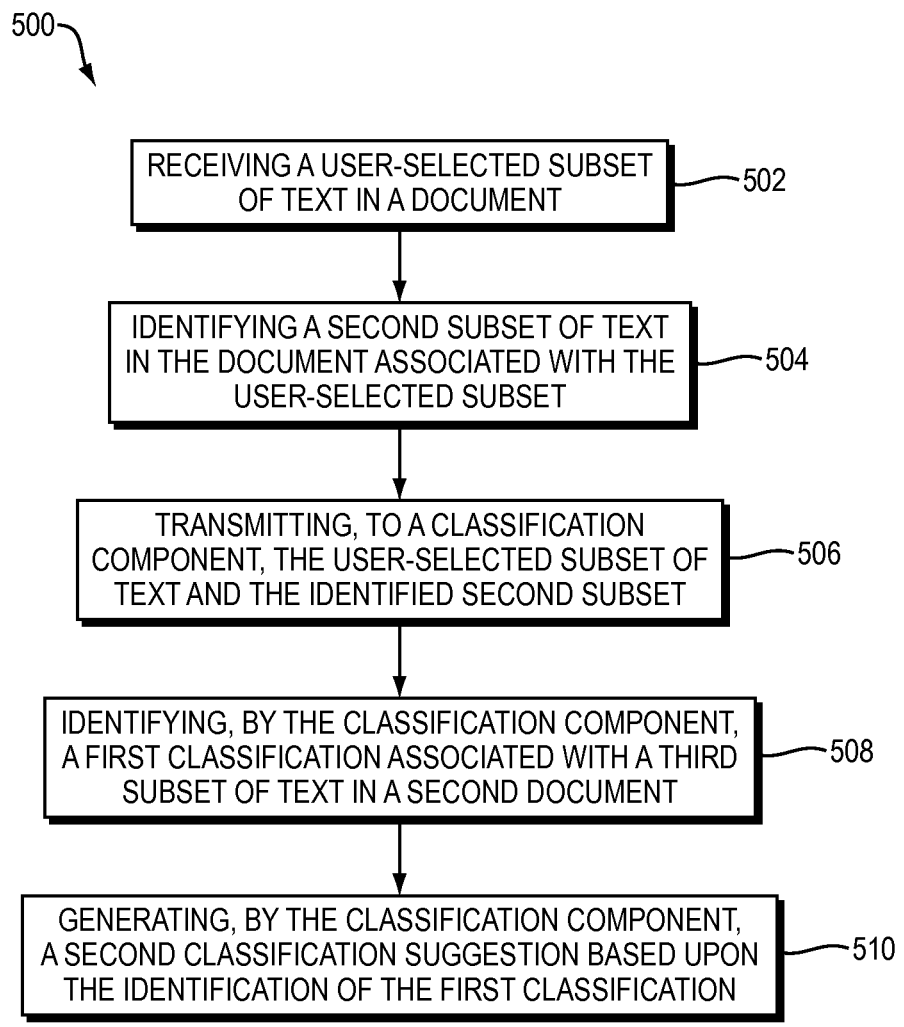
FIG. 5 is a flow diagram depicting an embodiment of a method for identifying and suggesting classifications for user-selected financial data.

Referring now to FIG. 5, a flow diagram depicts one embodiment of a method for identifying and suggesting classifications for user-selected financial data. In brief overview, a method 500 includes receiving a user-selected subset of text in a document (502). The method includes identifying a second subset of text in the document associated with the user-selected subset (504). The method includes transmitting, to a classification component, the user-selected subset of text and the identified second subset (506). The method includes identifying, by the classification component, a first classification associated with a third subset of text in a second document (508). The method includes generating, by the classification component, a second classification suggestion based upon the identification of the first classification (510).

Referring now to FIG. 5 in greater detail, and in connection with FIG. 1A, a user-selected subset of text in a document is received (502). In one embodiment, a user viewing the document 112 on the client computing device 102 selects a subset of text; for example, by highlighting a selection of text or via a user interface that allows the user to select the text. In another embodiment, the user-selected subset of text includes text such as, without limitation, financial data or information about financial data such as footnotes, disclaimers and descriptive text.

A second subset of text in the document associated with the user-selected subset is identified (504). In one embodiment, identifying the second subset includes identifying a title of a section of the document containing the user-selected subset. In another embodiment, identifying the second subset includes identifying a date or range of dates associated with the user-selected subset. In still another embodiment, the second subset of text includes an identification of a type of paragraph containing the user-selected subset. In some embodiments, the identification component 110 identifies the second subset of text.

The user-selected subset of text and the identified second subset are transmitted to a classification component (506). In one embodiment, the identification component 110 transmits the user-selected subset of text and the identified second subset to the classification component 120.

The classification component identifies a first classification associated with a third subset of text in a second document (508). In one embodiment, the classification component 120 analyzes previously classified sections of text to identify the third subset of text in the second document. In another embodiment, the classification component 120 searches (e.g., by querying the database 122) for previously classified sections of text that match the text in the user-selected subset of text. In still another embodiment, the classification component 120 searches for previously classified sections of text that match the text in the second subset of text. In another embodiment, a number of matches may be considered in tandem with one another. In yet another embodiment, the classification component 120 searches for a previously classified section of text that is substantially similar to the second subset of text.

The classification component generates a second classification suggestion based upon the identification of the first classification (510). In one embodiment, upon identifying the third subset of text in the second document, the classification component 120 determines whether a classification suggestion was previously generated for the third subset of text; if so, the classification component 120 uses the previously generated classification suggestion as the classification suggestion for user-selected subset of the text in the first document. In another embodiment, the classification component 120 generates a classification suggestion for the user-selected subset of the text in the first document based upon the previously generated classification suggestion.

In some embodiments, the classification component 120 performs a statistical analysis to compare the user-selected subset of text with previously analyzed user-selected subsets of text. In other embodiments, the classification component 120 generates a confidence measure based upon the likelihood that the user-selected subset of text matches the previously analyzed subsets of text. In some embodiments, the previously generated classification suggestion is provided to the user that selected the subset of text in the first document for review and confirmation or modification. In other embodiments, instead of performing operations 508 and 510, the classification component 120 generates the second classification suggestion by executing a classification engine 130 as described above in connection with FIGS. 4A and 4B.

By way of example, and without limitation, a user may select a footnote in a document 112; the classification component 120 receives the footnote and may also receive the second subset of text (e.g., text related to the footnote, such as a title, section, or other associated text). In this example, the classification component 120 searches for previously classified subsets of the document 112 or for previously classified subset of a second document 112b to identify text that is substantially similar to the user-selected subset of the document 112; upon identifying the previously classified subsets of text, the classification component 120 generates a classification for the footnote based on the classification applied to the previously classified subset of text.

Figure 6:
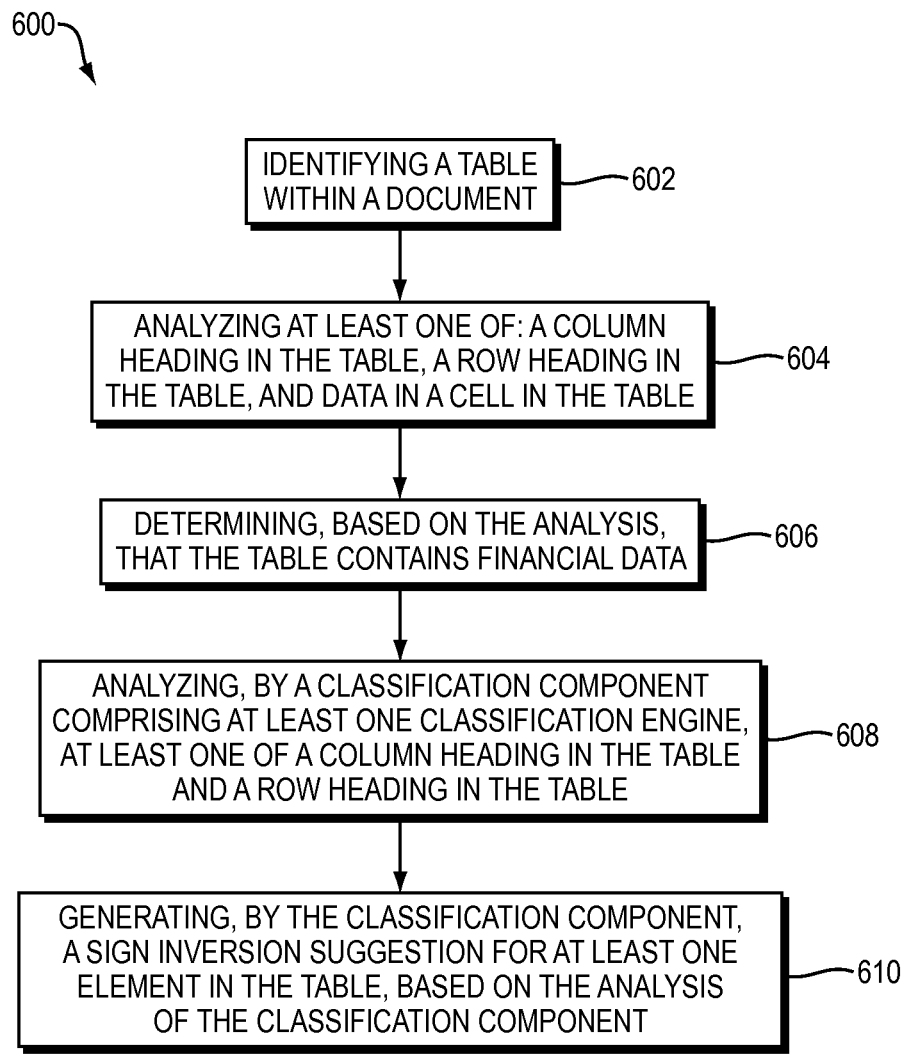
FIG. 6 is a flow diagram depicting an embodiment of a method for identifying and suggesting modifications to financial data.

Referring now to FIG. 6, a flow diagram depicts one embodiment of a method for identifying and suggesting modifications to financial data. In brief overview, a method 600 includes identifying a table within a document (602). The method includes analyzing at least one of: a column heading in the table, a row heading in the table, and data in a cell in the table (604). The method includes determining, based on the analysis, that the table contains financial data (606). The method includes analyzing, by a classification component comprising at least one classification engine, at least one of a column heading in the table and a row heading in the table (608). The method includes generating, by the classification component, a sign inversion suggestion for at least one element in the table, based on the analysis of the classification component (610).

Referring now to FIG. 6 in greater detail, and in connection with FIGS. 1 and 2, a table is identified within a document (602). In one embodiment, the table is identified as described above in connection with FIG. 2A.

The method 600 includes analyzing at least one of: a column heading in the table, a row heading in the table, and data in a cell in the table (604). In one embodiment, the analysis is performed as described above in connection with FIG. 2A.

The method 600 includes determining, based on the analysis, that the table contains financial data (606). In one embodiment, the determination that the table contains financial data is made as described above in connection with FIG. 2A.

The method 600 includes analyzing, by a classification component comprising at least one classification engine, at least one of a column heading in the table and a row heading in the table (608). In one embodiment, the classification component 120 performs the analysis as described above in connection with FIG. 2A.

The classification component generates a sign inversion suggestion for at least one element in the table, based on the analysis of the classification component (610). In one embodiment, the classification component 120 executes a classification engine 130 to generate the sign inversion suggestion. In another embodiment, the classification engine 130 may access previous indications of whether users confirmed previously generated sign inversion suggestions to improve the accuracy of generated sign inversion suggestions in the future. In some embodiments, the classification component 120 selects a classification engine 130 for execution and the classification engine 130 executes as described above in connection with FIGS. 4A-4B.

In one embodiment, the classification component 120 also generates a formatting suggestion; for example, the classification component 120 may suggest a conversion of a format of the at least one element in the table from a first format to a second format. Format modifications may include modifications to a scale (thousands, millions, etc.), a unit (pounds, dollars, euros, shares, etc.), and date formats. In another embodiment, the classification component 120 analyzes an element in the table, executing a pattern-matching algorithm to identify any dates, scales, or units. As with sign inversion suggestions and with classification suggestions, formatting suggestions are presented to and confirmed or modified by a user and then applied to at least one element as described above. The user's instruction regarding the formatting suggestion is stored and used to improve subsequent formatting suggestions.

In some embodiments, the classification component 120 generates the sign inversion suggestion as part of the process of generating classification suggestions. In financial reports, it is sometimes necessary to invert the sign of financial data, from positive to negative or from negative to positive. For example, if the text "−$300.00" appears in a financial report, it may be necessary to invert the sign of the number so that it becomes "+$300.00". In one embodiment, use of the methods and systems described herein provides an improved process for automatically determining whether signs should be inverted.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method comprising:
   identifying, by an identification component executing on a first computing device, a table within a first document;
   analyzing at least one of: a column heading in the table, a row heading in the table, and data in a cell in the table;
   determining, based on the analysis, that the table contains financial data classifiable according to a taxonomy;
   transmitting, by the identification component, to a classification component comprising at least one classification engine and executing on a second computing device, the table within the first document, based on the determination;
   analyzing, by the classification component, at least one of: a column heading in the table and a row heading in the table;
   generating, by the classification component, a classification suggestion for at least one element in the table, based on the analysis of the classification component, wherein generating the classification suggestion comprises executing a statistical process to identify at least one classification matching at least one of a column heading in the table and a row heading in the table;
   associating, by the classification component, a confidence measure with the generated classification suggestion;
   associating, by the classification component, a confidence measure with each of a plurality of classification suggestions, wherein the confidence measure differ for each of the plurality of classification suggestions;
   determining, by an engine selection component, that the classification component lacks at least one requirement of a first of a plurality of classification engines; and
   analyzing, by the engine selection component, a set of records stored by the classification component, each record in the set of records identifying a user instruction to apply a second classification suggestion to a second table, wherein determining that the classification component lacks at least one requirement further comprises determining that the set of records stored by the classification component contains a number of records less than a number required by the first of the plurality of classification engines.

2. The method of claim 1, wherein analyzing further comprises analyzing at least two of: a column heading in the table, a row heading in the table, and data in a cell in the table.

3. The method of claim 1, wherein analyzing further comprises analyzing a column heading in the table, a row heading in the table, and data in a cell in the table.

4. The method of claim 1, wherein generating the classification suggestion further comprises executing the at least one classification engine to identify at least one classification matching at least one of a column heading in the table and a row heading in the table.

5. The method of claim 1 further comprising extracting, by the identification component, the analyzed table from the first document.

6. The method of claim 5 further comprising transmitting, by the identification component, to the classification component, the analyzed table.

7. The method of claim 1 further comprising annotating the first document to include an identification of the table as a table containing financial data.

8. The method of claim 7 further comprising transmitting, by the identification component, to the classification component, the annotated first document.

9. The method of claim 1 further comprising receiving, by the identification component, an identification of the taxonomy.

10. The method of claim 1 further comprising generating, by the classification component, a second document comprising the at least one element, the generated classification suggestion, a confidence measure associated with the generated classification suggestion, and an indication of whether a user associated the generated classification suggestion with the at least one element.

11. The method of claim 1, wherein generating the classification suggestion further comprises generating a classification suggestion for a plurality of cells in the table, based on the analysis of the classification component.

12. The method of claim 1, wherein generating the classification suggestion further comprises generating a classification suggestion for a row containing a plurality of cells in the table, based on the analysis of the classification component.

13. The method of claim 1, wherein generating the classification suggestion further comprises generating a classification suggestion for a column containing a plurality of cells in the table, based on the analysis of the classification component.

14. The method of claim 1, wherein generating the classification suggestion further comprises generating a classification suggestion selected from the taxonomy.

15. The method of claim 1, wherein determining further comprises determining that the table contains a number indicative of financial data.

16. The method of claim 1, wherein determining further comprises determining that the table contains a date indicative of financial data.

17. The method of claim 1, wherein determining further comprises determining that the table contains a character indicative of financial data.

18. The method of claim 1, wherein analyzing further comprises analyzing, by a classification component comprising a plurality of classification engines, at least one of a column heading in the table and a row heading in the table.

19. A system comprising: an identification component (i) executing on a first computing device, the first computing device including a first memory and a first processor, (ii) identifying a table within a first document, (iii) analyzing at least one of: a column heading in the table, a row heading in the table, and data in a cell in the table, and (iv) determining, based on the analysis, that the table contains financial data classifiable according to a taxonomy; and a classification component comprising at least one classification engine (i) executing on a second computing device, the second computing device including a second memory and a second processor, (ii) analyzing at least one of a column heading in the table and a row heading in the table, (iii) generating a classification suggestion for at least one element in the table, based on the analysis of the classification component, (iv) associating a confidence measure with the generated classification suggestion, and (v) associating a confidence measure with each of a plurality of classification suggestions, wherein the confidence measure differs for each of the plurality of classification suggestions;
wherein generating the classification suggestion comprises executing a statistical process to identify at least one classification matching at least one of a column heading in the table and a row heading in the table;
determining, by an engine selection component, that the classification component lacks at least one requirement of a first of a plurality of classification engines; and analyzing, by the engine selection component, a set of records stored by the classification component, each record in the set of records identifying a user instruction to apply a second classification suggestion to a second table, wherein determining that the classification component lacks at least one requirement further comprises determining that the set of records stored by the classification component contains a number of records less than a number required by the first of the plurality of classification engines.

20. The system of claim 19, wherein the at least one classification engine comprises at least one machine learning engine.

21. The system of claim 19, wherein the identification component further comprises a software agent in communication with a word processing application.

22. The system of claim 19, wherein the identification component further comprises a software component embedded into a word processing application.

23. The system of claim 19, wherein the identification component and the classification component execute on the same computing device.

24. The system of claim 19 further comprising a user interface provided by the computing device, receiving the classification suggestion from the classification component, and displaying the classification suggestion to a user of the first computing device.

25. The system of claim 19, wherein the identification component further comprises means for extracting the analyzed table from the first document.

26. The system of claim 19, wherein the identification component further comprises means for transmitting, to the classification component, the analyzed table.

27. The system of claim 19, wherein the identification component further comprises means for annotating the first document to identify the analyzed table within the first document as a table containing financial data, responsive to the determination.

28. The system of claim 27, wherein the identification component further comprises means for transmitting, to the classification component, the annotated first document.

29. The system of claim 19, wherein the identification component further comprises means for receiving an identification of the taxonomy.

30. The system of claim 19, wherein the classification component further comprises a plurality of classification engines.

31. A non-transitory computer readable medium having instructions thereon that when executed provide a method, the non-transitory computer readable medium comprising:
instructions to identify a table within a first document;
instructions to analyze at least one of: a column heading in the table, a row heading in the table, and data in a cell in the table;
instructions to determine, based on the analysis, that the table contains financial data classifiable according to a taxonomy;
instructions to analyze, by a classification component comprising at least one classification engine, at least one of a column heading in the table and a row heading in the table;
instructions to generate, by the classification component, a classification suggestion for at least one element in the table, based on the analysis of the classification component, wherein generating the classification suggestion comprises executing a statistical process to identify at least one classification matching at least one of a column heading in the table and a row heading in the table;
instructions to associate, by the classification component, a confidence measure with the generated classification suggestion;
instructions to associate, by the classification component, a confidence measure with each of a plurality of classification suggestions, wherein the confidence measure differ for each of the plurality of classification suggestions;
instructions to determine, by an engine selection component, that the classification component lacks at least one requirement of a first of a plurality of classification engines; and
instructions to analyze, by the engine selection component, a set of records stored by the classification component, each record in the set of records identifying a user instruction to apply a second classification suggestion to a second table, wherein determining that the classification component lacks at least one requirement further comprises determining that the set of records stored by the classification component contains a number of records less than a number required by the first of the plurality of classification engines.

32. The non-transitory computer readable medium of claim 31, wherein instructions to generate the classification suggestion comprise instructions to execute a statistical process to identify at least one classification matching at least one of a column heading in the table and a row heading in the table.

33. The non-transitory computer readable medium of claim 31 further comprising instructions to associate, by the classification component, a confidence measure with the generated classification suggestion.

34. The non-transitory computer readable medium of claim 33 further comprising instructions to associate, by the classification component, a confidence measure for each of a plurality of classification suggestions, wherein the confidence measures differ for each of the plurality of classification suggestions.

35. The non-transitory computer readable medium of claim 31, wherein instructions to generate the classification suggestion further comprise instructions to execute the at least one classification engine to identify at least one classification matching at least one of a column heading in the table and a row heading in the table.

36. The non-transitory computer readable medium of claim 31 further comprising instructions to generate, by the classification component, a second document comprising the at least one element, the generated classification suggestion, a confidence measure associated with the generated classification suggestion, and an indication of whether a user associated the generated classification suggestion with the at least one element.

37. The non-transitory computer readable medium of claim 31, wherein instructions to generate the classification suggestion further comprise instructions to generating a classification suggestion selected from the taxonomy.

38. A method comprising:
- receiving, by a classification component executing on a first computing device, from an identification component executing on a second computing device, a table determined by the identification component to contain financial data classifiable according to a taxonomy;
- generating, by the classification component, a classification suggestion for at least one element in the table, wherein generating the classification suggestion comprises executing a statistical process to identify at least one classification matching at least one of a column heading in the table and a row heading in the table;
- associating, by the classification component, a confidence measure with the generated classification suggestion;
- displaying, by the classification component, the classification suggestion for the at least one element in the table and the confidence measure associated with the classification suggestion;
- associating, by the classification component, a confidence measure with each of a plurality of classification suggestions, wherein the confidence measures differ for each of the plurality of classification suggestions;
- receiving, by the classification component, from a user of the second computing device, an instruction to classify the at least one element of the table with the classification suggestion;
- applying, by the classification component, the classification suggestion to the at least one element of the table to produce at least one classified element of the table; and
- generating, by the classification component, a first document including the at least one classified element of the table;
- determining, by an engine selection component, that the classification component lacks at least one requirement of a first of a plurality of classification engines; and
- analyzing, by the engine selection component, a set of records stored by the classification component, each record in the set of records identifying a user instruction to apply a second classification suggestion to a second table, wherein determining that the classification component lacks at least one requirement further comprises determining that the set of records stored by the classification component contains a number of records less than a number required by the first of the plurality of classification engines.

39. The method of claim 38 further comprising receiving, by the classification component, from the user, an instruction to modify the classification suggestion prior to classifying the at least one element of the table with the classification suggestion.

40. The method of claim 38 further comprising receiving, by the classification component, the first document including the at least one element.

41. The method of claim 40, wherein generating the first document comprises modifying, by the classification component, the first document to include the at least one classified element of the table.

42. The method of claim 38 wherein generating comprises generating, by the classification component, a first document comprising the at least one element, the classification suggestion, the confidence measure, and the at least one classified element.

43. The method of claim 38 further comprising generating, by the classification component, a second document comprising the at least one element, the classification suggestion, the confidence measure, and the at least one classified element.

44. The method of claim 38, wherein displaying a classification suggestion further comprises displaying a second classification with a second confidence measure.

45. The method of claim 44, wherein receiving the instruction further comprises receiving, from the user, a selection of one of the first classification suggestion and the second classification suggestion.

46. The method of claim 45, wherein applying the classification suggestion further comprises applying the selected one of the first classification suggestion and the second classification suggestion to the at least one element in the table.

47. The method of claim 38 further comprising displaying a second classification suggestion for at least one element in a second table containing financial data and a second confidence measure associated with the second classification suggestion, the second classification suggestion based at least in part on the received user instruction.

48. A non-transitory computer readable medium having instructions thereon that when executed provide a method, the computer readable medium comprising:
- instructions to receive, by a classification component executing on a first computing device, from an identification component executing on a second computing device, a table determined by the identification component to contain financial data classifiable according to a taxonomy;
- instructions to generate, by the classification component, a classification suggestion for at least one element in the table, wherein generating the classification suggestion comprises executing a statistical process to identify at least one classification matching at least one of a column heading in the table and a row heading in the table;
- instructions to associate, by the classification component, a confidence measure with the generated classification suggestion;
- instructions to display the classification suggestion for the at least one element in the table and the confidence measure associated with the classification suggestion;
- instructions to associate, by the classification component, a confidence measure with each of a plurality of classification suggestions, wherein the confidence measure differ for each of the plurality of classification suggestions;
- instructions to receive, from a user of the second computing device, an instruction to classify the at least one element of the table with the classification suggestion;
- instructions to apply, by the classification component, the classification suggestion to the at least one element of the table to produce at least one classified element of the table;
- instructions to generate, by the classification component, a first document including the at least one classified element of the table;
- instructions to determine, by an engine selection component, that the classification component lacks at least one requirement of a first of a plurality of classification engines; and
- instructions to analyze, by the engine selection component, a set of records stored by the classification component, each record in the set of records identifying a user instruction to apply a second classification suggestion to a second table, wherein determining that the classification component lacks at least one requirement further comprises determining that the set of records stored by the classification component contains a number of records less than a number required by the first of the plurality of classification engines.

49. The non-transitory computer readable medium of claim 48 further comprising instructions to receive, by the classification component, from the user, an instruction to modify the classification suggestion prior to classifying the at least one element of the table with the classification suggestion.

50. The non-transitory computer readable medium of claim 48 further comprising instructions to receive, by the classification component, the first document including the at least one element.

51. The non-transitory computer readable medium of claim 50, wherein instructions to generate the first document comprise instructions to modify, by the classification component, the first document to include the at least one classified element of the table.

52. The non-transitory computer readable medium of claim 48 wherein instructions to generate comprise instructions to generate, by the classification component, a first document comprising the at least one element, the classification suggestion, the confidence measure, and the at least one classified element.

53. The non-transitory computer readable medium of claim 48 further comprising instructions to generate, by the classification component, a second document comprising the at least one element, the classification suggestion, the confidence measure, and the at least one classified element.

54. The non-transitory computer readable medium of claim 48, wherein instructions to display a classification suggestion further comprise instructions to display a second classification with a second confidence measure.

55. The non-transitory computer readable medium of claim 54, wherein instructions to receive the instruction further comprise instructions to receive, from the user, a selection of one of the first classification suggestion and the second classification suggestion.

56. The non-transitory computer readable medium of claim 55, wherein instructions to apply the classification suggestion further comprise instructions to apply the selected one of the first classification suggestion and the second classification suggestion to the at least one element in the table.

57. The non-transitory computer readable medium of claim 48 further comprising instructions to display a second classification suggestion for at least one element in a second table containing financial data and a second confidence measure associated with the second classification suggestion, the second classification suggestion based at least in part on the received user instruction.

58. A method comprising:
receiving, by a classification component, a table containing financial data for classification by one of a plurality of classification engines;
determining, by an engine selection component, that the classification component lacks at least one requirement of a first of the plurality of classification engines;
directing, by the engine selection component, an analysis of the table to a second of the plurality of classification engines, responsive to the determination; and
generating, by the second of the plurality of classification engines, a classification suggestion for at least one element in the table, wherein generating the classification suggestion comprises executing a statistical process to identify at least one classification matching at least one of a column heading in the table and a row heading in the table;
associating, by the classification component, a confidence measure with the generated classification suggestion;
associating, by the classification component, a confidence measure with each of a plurality of classification suggestions, wherein the confidence measures differ for each of the plurality of classification suggestions; and
analyzing, by the engine selection component, a set of records stored by the classification component, each record in the set of records identifying a user instruction to apply a second classification suggestion to a second table, wherein determining that the classification component lacks at least one requirement further comprises determining that the set of records stored by the classification component contains a number of records less than a number required by the first of the plurality of classification engines.

59. The method of claim 58 further comprising:
receiving, by the classification component, a second table containing financial data for classification by one of the plurality of classification engines;
determining, by the engine selection component, that the classification component satisfies at least one requirement of the first of the plurality of classification engines;
directing, by the engine selection component, an analysis of the second table to the first of the plurality of classification engines, responsive to the determination; and
generating, by the first of the plurality of classification engines, a classification suggestion for at least one element in the second table.

60. A system comprising:
a classification component executing on a computing device and receiving a table containing financial data for classification by one of a plurality of classification engines;
an engine selection component (i) executing on the computing device, the computing device including a memory and a processor, (ii) determining that the classification component lacks at least one requirement of a first of the plurality of classification engines, and (iii) directing an analysis of the table to a second of the plurality of classification engines, responsive to the determination; and
the second of the plurality of classification engines generating a classification suggestion for at least one element in the table, wherein generating the classification suggestion comprises executing a statistical process to identify at least one classification matching at least one of a column heading in the table and a row heading in the table;
associating, by the classification component, a confidence measure with the generated classification suggestion;
associating, by the classification component, a confidence measure with each of a plurality of classification suggestions, wherein the confidence measures differ for each of the plurality of classification suggestions;
and analyzing, by the engine selection component, a set of records stored by the classification component, each record in the set of records identifying a user instruction to apply a second classification suggestion to a second table, wherein determining that the classification component lacks at least one requirement further comprises determining that the set of records stored by the classification component contains a number of records less than a number required by the first of the plurality of classification engines.

61. A non-transitory computer readable medium having instructions thereon that when executed provide a method, the computer readable medium comprising:
instructions to receive, by a classification component, a table containing financial data for classification by one of a plurality of classification engines;

instructions to determine, by an engine selection component, that the classification component lacks at least one requirement of a first of the plurality of classification engines;

instructions to direct, by the engine selection component, an analysis of the table to a second of the plurality of classification engines, responsive to the determination; and instructions to generate, by the second of the plurality of classification engines, a classification suggestion for at least one element in the table, wherein generating the classification suggestion comprises executing a statistical process to identify at least one classification matching at least one of a column heading in the table and a row heading in the table;

instructions to associate, by the classification component, a confidence measure with the generated classification suggestion;

instructions to associate, by the classification component, a confidence measure with each of a plurality of classification suggestions, wherein the confidence measure differ for each of the plurality of classification suggestions;

and instructions to analyze, by the engine selection component, a set of records stored by the classification component, each record in the set of records identifying a user instruction to apply a second classification suggestion to a second table, wherein instructions to determine that the classification component lacks at least one requirement further comprise instructions to determine that the set of records stored by the classification component contains a number of records less than a number required by the first of the plurality of classification engines.

62. The non-transitory computer readable medium of claim 61 further comprising:

instructions to receive, by the classification component, a second table containing financial data for classification by one of the plurality of classification engines;

instructions to determine, by the engine selection component, that the classification component satisfies at least one requirement of the first of the plurality of classification engines;

instructions to direct, by the engine selection component, an analysis of the second table to the first of the plurality of classification engines, responsive to the determination; and instructions to generate, by the first of the plurality of classification engines, a classification suggestion for at least one element in the second table.

* * * * *